(12) United States Patent
Watanabe et al.

(10) Patent No.: US 6,625,008 B2
(45) Date of Patent: Sep. 23, 2003

(54) ELECTRICAL DOUBLE LAYER CAPACITOR AND PORTABLE ELECTRONIC APPARATUS EQUIPPED WITH ELECTRICAL DOUBLE LAYER CAPACITOR

(75) Inventors: Shunji Watanabe, Chiba (JP); Hideharu Onodera, Chiba (JP); Tsugio Sakai, Chiba (JP); Toyoo Harada, Chiba (JP); Yoshimi Kanno, Chiba (JP); Shinichi Takasugi, Chiba (JP); Tsuneaki Tamachi, Chiba (JP)

(73) Assignee: Seiko Instruments inc. (JP)

( * ) Notice: Subject to any disclaimer, the term of this patent is extended or adjusted under 35 U.S.C. 154(b) by 0 days.

(21) Appl. No.: 10/213,258

(22) Filed: Aug. 6, 2002

(65) Prior Publication Data

US 2003/0128499 A1 Jul. 10, 2003

Related U.S. Application Data

(63) Continuation-in-part of application No. 09/490,833, filed on Jan. 25, 2000, now Pat. No. 6,459,564.

(30) Foreign Application Priority Data

Jan. 26, 1999 (JP) .......................................... 11-017700
Sep. 8, 1999 (JP) .......................................... 11-254915

(51) Int. Cl.$^7$ ................................................ H01G 9/00
(52) U.S. Cl. ........................ 361/502; 361/503; 361/504; 361/508; 361/512; 361/516
(58) Field of Search ................................. 361/502, 503, 361/504, 505, 508, 509, 511, 512, 513, 523, 525, 528

(56) References Cited

U.S. PATENT DOCUMENTS

| | | | | |
|---|---|---|---|---|
| 5,351,164 | A | * | 9/1994 | Grigortchak et al. |
| 5,429,893 | A | * | 7/1995 | Thomas |
| 5,953,204 | A | * | 9/1999 | Suhara et al. |
| 6,195,251 | B1 | * | 2/2001 | Suhara et al. |

* cited by examiner

Primary Examiner—Dean A. Reichard
Assistant Examiner—Nguyen Ha
(74) Attorney, Agent, or Firm—Adams & Wilks

(57) ABSTRACT

An electrical double layer capacitor has an electrolyte included of a non-aqueous solvent and a supporting salt dissolved in the non-aqueous solvent. A pair of polarizing electrodes are disposed in confronting relation with one another. A separator is disposed between the polarizing electrodes. The supporting salt contained in the electrolyte exists only in regions proximate a surface of the polarizing electrodes when the electrical double layer capacitor is fully charged. When the electrical double layer capacitor is charged at 3.3 V for 24 hours, a charged current after 24 hours is in the range of from about 5 $\mu$A/cm$^2$ to about 22 $\mu$A/cm$^2$ per unit area of the polarizing electrodes.

15 Claims, 9 Drawing Sheets

Discharged state

Fully charged state

Discharged state

Fully charged state

ELECTRICAL DOUBLE LAYER CAPACITOR AND PORTABLE ELECTRONIC APPARATUS EQUIPPED WITH ELECTRICAL DOUBLE LAYER CAPACITOR

This application is a continuation-in-part of application Ser. No. 09/490,833 filed Jan. 25, 2000 now U.S. Pat. No. 6,459,564.

BACKGROUND OF THE INVENTION

The present invention relates to a high-performance electrical double layer capacitor formed by utilizing the principle of electrical double layer.

Electrical double layer capacitors are conventionally used as a backup power supply for semiconductor memory, as an auxiliary power source for electronic devices (such as microcomputers and IC memories), as a battery for solar watches, and as a power source to drive motors. They have recently been expected to find use as a power source for electric vehicles and as an auxiliary unit for energy conversion and storage systems.

In the case of an electrical double layer capacitor with electrodes formed from carbonaceous material, such as activated carbon, activated carbon fiber, and carbon black, its electric capacity depends basically on the surface characteristics and the BET specific surface area (measured by nitrogen adsorption) of the carbonaceous material, and its internal resistance is governed by the electric conductivity of the electrolyte. Therefore, there has been an increasing trend toward employing an electrolyte with a high electrical conductivity for reduction in internal resistance and for improvement in quick recharging performance and heavy current discharging performance.

Electrical double layer capacitors vary in applicable voltage depending on the kind of electrolyte employed therein. The applicable voltage is 2V or less in the case of an aqueous electrolyte formed by dissolving a supporting salt in water. By contrast, it is about 3V in the case of a non-aqueous electrolyte. In practical use, however, when a voltage of 2.5V or more is applied, the advantage of a non-aqueous electrolyte over an aqueous one diminishes because of its drawbacks, such as decomposition evolving gas and side reactions to dissolve the casing, leading to liquid leakage and capacity decrease. In addition, a non-aqueous electrolyte has a disadvantage of wasting electric power due to the leak current which flows when charging voltage remains on after full charging has occurred.

SUMMARY OF THE INVENTION

The present inventors have found that the electrical double layer capacitor greatly increases in withstanding voltage if the amount of supporting salt is reduced to such an extent that the electrolyte substantially becomes an insulator after the electrical double layer has been formed. They employed a process which consists of moving close to the electrode surface almost all the ionized supporting salt contained in the electrolyte when fully charged. This process creates a state in which, even when a high voltage remains applied, the electrolyte remote from the electrode is free of the ionized supporting salt which brings about side reactions. As a result, the electrolyte becomes nearly an insulator after the electrical double layer has been formed by full charging. Thus, a higher voltage can be applied without side reactions, and leak current after full charging decreases, resulting in power saving. In addition, the present inventors have found that the withstanding voltage increases with the decreasing ratio of the negative electrode capacity to the positive electrode capacity.

DETAILED DESCRIPTION OF THE PREFERRED EMBODIMENTS

On the electrode surface with full charging, an electrical double layer is formed by the ionized supporting salt. The amount of the supporting salt adsorbed is determined by the surface area of the electrode and the voltage applied. If the supporting salt exists in an excess amount as compared with the surface area of the electrode, the supporting salt continues to exist in the electrolyte even after full charging. If the amount of the supporting salt is small, the supporting salt is adsorbed close to the electrode surface and hence hardly exists in the electrolyte remote from the electrode.

Figure 2A:
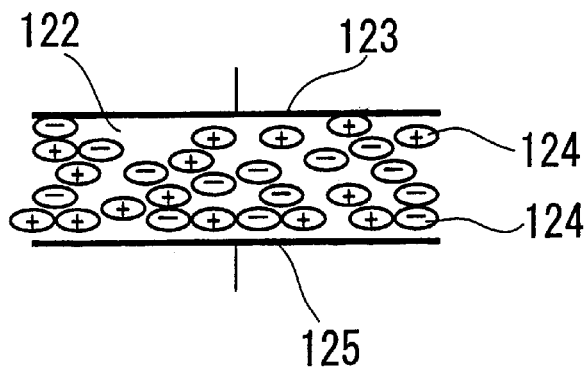
FIGS. 2A–2B are schematic diagrams illustrating the principle of the electrical double layer capacitor according to the prior art technology.
Figure 2B:
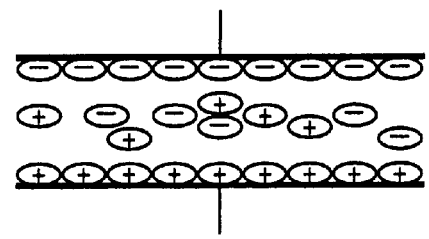

The invention will be described below with reference to FIGS. 2A–2B and 3A–3B. When fully charged, it is in the state as shown in FIG. 2B. The conventional electrical double layer capacitor is designed to dissolve more supporting salt 124 in the non-aqueous solvent 122 than the supporting salt moving close to the surface of positive electrode 123 and surface of negative electrode 125 after full charging in order to permit quick charging and reduce internal resistance. If the voltage applied in this state exceeds 2.5V, the excess supporting salt 124 existing between the electrodes brings about side reactions, such as decomposition of electrolyte and dissolution of casing. These side reactions lead to trouble such as solution leakage and capacity decrease.

Figure 3A:
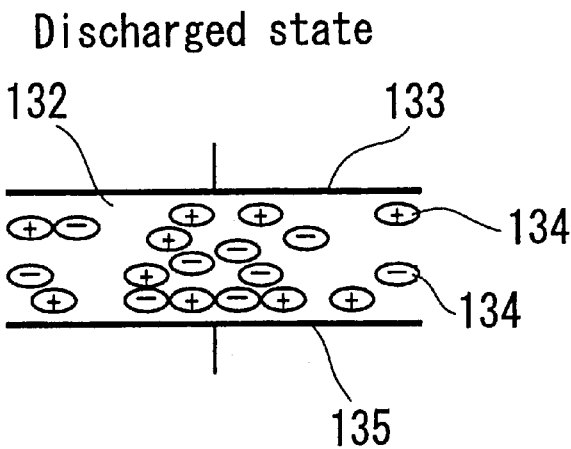
FIGS. 3A–3B are schematic diagrams illustrating the principle of the electrical double layer capacitor according to the present invention.
Figure 3B:
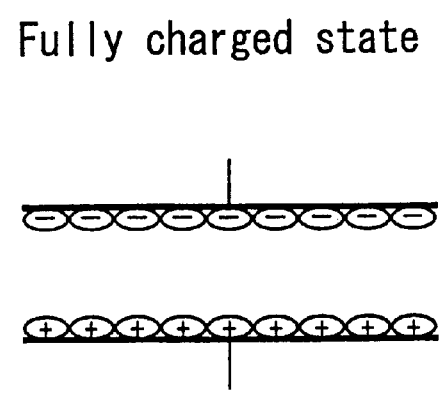

The electrical double layer capacitor according to the present invention is in the state as shown in FIG. 3B, with a voltage applied after full charging. Apparently, the supporting salt 134 moves in the vicinity of the surface of positive electrode 133 and surface of negative electrode 135. The supporting salt 134 does not exist in the non-aqueous solvent 132 any longer and the electrolyte becomes an insulator. The supporting salt 134 in this state does not bring about side reactions (such as decomposition of electrolyte and dissolution of casing) even though the applied voltage exceeds 2.5V. The withstanding voltage in such conditions would be the breakdown voltage of the non-aqueous solvent. Ideally, the concentration of the supporting salt in the electrolyte should be null after full charging, for the electrical double layer capacitor to increase in withstanding voltage. In practice, however, it has been experimentally confirmed that the withstanding voltage is effectively increased if the internal resistance of the capacitor after full charging is greater than ten times that of before charging. The amount of the supporting salt to be dissolved may be roughly calculated from the surface area of the electrode and the size of the ionized supporting salt. For example, the amount of the supporting salt to be dissolved in the electrolyte in the electrical double layer capacitor is given by $(A \times B/C^2)/N_A$ mol (where A is the specific surface area ($m^2/g$) of activated carbon, B is the amount (g) of activated carbon on one side of the electrode, C is a side (m) of a square corresponding to the molecule of the ionized supporting salt, and $N_A$ is Avogadro's constant). The calculated value is merely a measure because the ionized supporting salt does not always form a monomolecular layer when adsorbed onto the surface of the electrode. To determine the amount of the supporting salt in practice, the calculated value should be adequately modified within the reliability required, with the charging voltage taken into account.

If the amount of the supporting salt dissolved in the electrolyte is such that the ionized supporting salt remains in a small amount after full charging, the voltage decrease in the initial discharging period can be prevented to some extent. In addition, the withstanding voltage increases further if the negative electrode capacity is decreased relative to the positive electrode capacity.

The present inventors' extensive investigations revealed that the electrical double layer capacitor varies in electrode potential at the time of charging depending on the capacity ratio of the positive electrode and negative electrode. The results of measurements of the electrical potential in the battery are mentioned below. An electrolyte was prepared by dissolving 1 mole of $(CH_3)(C_2H_5)_3NBF_4$ (as a supporting salt) in 1 liter of propylene carbonate (PC). In this electrolyte, a positive electrode and a negative electrode both made of activated carbon were immersed, with its capacity ratio varied. A voltage of 3.3V was applied across the positive electrode and the negative electrode, and the electrode potential relative to the lithium reference electrode was measured. The results are shown in Table 1.

TABLE 1

| Positive electrode | | Negative electrode | |
| --- | --- | --- | --- |
| Capacity ratio | Potential (V vs. Li) | Capacity ratio | Potential (V vs. Li) |
| 1 | 4.8 | 1 | 1.6 |
| 2 | 4.5 | 1 | 1.25 |
| 2.5 | 4.4 | 1 | 1.1 |
| 3 | 4.3 | 1 | 1 |

Both the positive electrode and negative electrode gave an electrode potential of 3.0V vs. Li before voltage application. When a voltage was applied across the positive electrode and negative electrode immersed in an electrolyte, the positive electrode potential increased and the negative electrode potential decreased as the ionized supporting salt became adsorbed.

When a voltage of 3.3V was applied across the positive electrode and negative electrode whose capacity ratio (which is equivalent to weight ratio because they are made of the same material) is 1:1, the positive electrode potential increased by 1.8V (reaching 4.8V vs. Li) and the negative electrode potential decreased by 1.4V (reaching to 1.6V vs. Li). This indicates that the positive electrode potential fluctuates more than the negative electrode potential. If the capacity ratio of the negative electrode is reduced relative to the capacity ratio of the positive electrode, the negative electrode potential fluctuates more than the positive electrode potential.

The reason for this is presumed as follows. When one electrode is restricted in its area, the amount of electrolyte ions to be adsorbed onto it from the other electrode is limited. This adsorption resistance brings about polarization, which raises the positive electrode potential and decreases the negative electrode potential.

The positive electrode potential should be kept at 4.5V vs. Li or less so as to prevent the decomposition of the electrolyte. On the other hand, if the negative electrode potential decreases to around 1.1V vs. Li, gas will be evolved due to reactions between PC and activated carbon.

For the battery to have a withstanding voltage of 3.3V, it is necessary that the positive electrode potential is not higher than 4.5V vs. Li and the negative electrode potential is not lower than 1.1V vs. Li. Alternatively, it is necessary that the concentration of the supporting salt should be low enough to prevent side reactions on the electrodes at the above-mentioned critical positive electrode and negative electrode potential. It is apparent from Table 1 that the ratio of the positive electrode capacity to the negative electrode capacity should be around 2:1, within a permissible range from 2.5±0.5:1.

The electrical double layer capacitor greatly increases in withstanding voltage if the concentration of the supporting salt and the ratio of the electrode area are controlled simultaneously. It increases in output voltage if the negative electrode has a smaller area than the positive electrode so that the negative electrode voltage decreases. Since the potential difference between the positive electrode and the negative electrode determines the output voltage of the electrical double layer capacitor, a reduction in the negative electrode potential leads to an increase in output voltage.

The electrodes of the electrical double layer capacitor may be formed from activated carbon powder by pressing or rolling together with an adequate binder. The activated carbon powder may be obtained by activating sawdust, coconut husk, pitch, or the like. The activated carbon may be replaced by activated carbon fiber, which is obtained from phenolic fiber, rayon fiber, acrylic fiber, or pitch fiber by infusibilization or carbonization. The carbon fiber may be used in the form of felt, fiber, paper, or sintered body. Other carbonaceous materials include polyaniline (PAN) and polyacene (PAS).

The active materials for the positive electrode and negative electrode may be the same or different, and more than one active materials may be used in combination.

The electrolyte is not specifically restricted. It may be any non-aqueous solvent used for conventional electrical double layer capacitors and non-aqueous secondary batteries. Cyclic esters, chain esters, cyclic ethers, chain ethers or the like can be used for the non-aqueous solvent. Their specific examples are:

propylene carbonate (PC), ethylene carbonate (EC), butylene carbonate (BC), vinylene carbonate, dimethyl carbonate (DMC), diethyl carbonate (DEC), γ-butyrolactone (γ-BL), 2-methyl-γ-butyrolactone, acetyl-γ-butyrolactone, γ-valerolactone, 1,2-dimethoxyethane (DME), 1,2-ethoxyethane, diethyl ether, ethyleneglycol dialkyl ether, diethyleneglycol dialkyl ether, triethyleneglycol dialkyl ether, tetraethyleneglycol dialkyl ether, dipropylene carbonate, methyl ethyl carbonate, methyl butyl carbonate, methyl propyl carbonate, ethyl butyl carbonate, ethyl propyl carbonate, butyl propyl carbonate, propionic alkyl ester, malonic dialkyl ester, acetic alkyl ester, tetrahydrofuran (THF), alkyltetrahydrofuran, dialkyltetrahydrofuran, alkoxytetrahydrofuran, dialkoxytetrahydrofuran, 1,3-dioxolane, alkyl-1,3-dioxolane, 1,4-dioxolane, 2-methyltetrahydrofuran, dimethylsulfoxide, 1,3-dioxolane, formamide, dimethylformamide, dioxolane, acetonitrile, nitromethane, methyl formate, methyl acetate, methyl propionate, ethyl propionate, phosphoric triester, maleic anhydride, sulfolane, and 3-methylsulfolane. Their derivatives are also included. They may be used alone or in combination.

These non-aqueous solvents may contain water and organic hydroxides (e.g., glycol, alcohol, and carboxylic acid), as impurities. It is considered that impurities form an insulating film on the surface of the electrode, thereby increasing the interfacial resistance of the electrode, with the result that the cycle life and capacity decrease and the self-discharge increases during storage at high temperatures (60° C. or higher). Thus the content of impurities should be as low as possible. Specifically, the content of water should be 50 ppm or less and the content of organic hydroxides should be 1000 ppm or less.

The examples for the supporting salt include $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PCF_3SO_4$, $(C_2H_5)_4NPF_6$, lithium perchlorate ($LiClO_4$), lithium hexafluorophosphate ($LiPF_6$), lithium borofluoride ($LiBF_6$), lithium hexafluoroarsenide ($LiAsF_6$), lithium trifluorometasulfonate ($LiCF_3SO_3$), bis-trifluoromethylsulfonylimide lithium [$LiN(CF_3SO_2)_2$], lithium thiocyanate, and lithium aluminum fluoride. They may be used alone or in combination of these examples, ammonium salts are preferable from the standpoint of cycle characteristics and storage properties.

The above-mentioned supporting salt may be used in combination with a polyethylene oxide derivative (or a polymer containing it), a polypropylene oxide derivative (or a polymer containing it), a phosphate ester polymer or the like.

The electrical double layer capacitor of the present invention may be used in the form of coil, button, sheet, cylinder, or cube. More than one unit may be connected in series or parallel or laminated.

EXAMPLE 1

Figure 1:
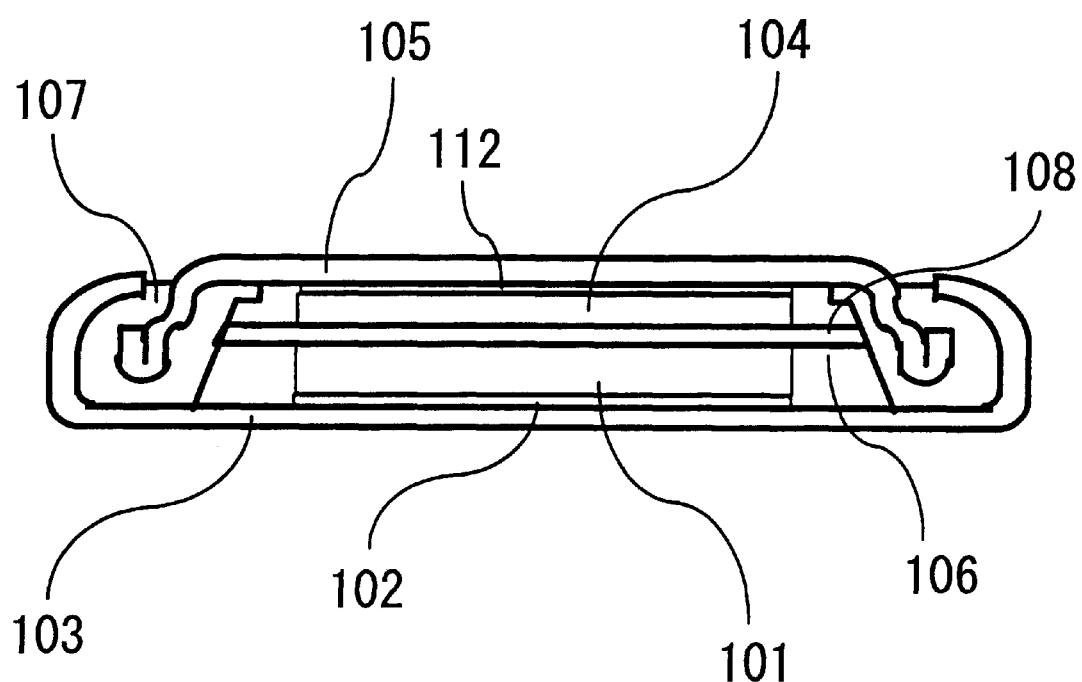
FIG. 1 is a sectional view of the electrical double layer capacitor according to the present invention.

This example demonstrates a battery in which activated carbon is used as the positive electrode active material and the negative electrode active material. The battery is shown in section in FIG. 1. The battery measures 6.8 mm in outside diameter and 2.1 mm thick.

The battery was produced in the following manner. First, an positive electrode mixture was prepared from commercially available activated carbon (with a specific surface area of 2260 m$^2$/g), carbon black as a conducting material, and fluorocarbon plastics as a binder in a mixing ratio of 80:12:8 by weight. The positive electrode mixture was formed into a sheet, 0.8 mm in thickness and about 0.4 g/cm$^3$ in volume density. This sheet was punched into circular electrode pellets, 4 mm in diameter. Each electrode pellet contains 3.2 mg of activated carbon. The electrode pellet (functioning as the positive electrode 101) is bonded to the positive electrode case 103 with a conductive resin adhesive containing conductive carbon (functioning as the electrode collector 102). The assembly was heated at 150° C. for 8 hours for drying under reduced pressure. Likewise, the electrode pellet (functioning as the negative electrode 104) is bonded to the negative electrode case 105 with a conductive resin adhesive containing conductive carbon (functioning as the electrode collector 112). The assembly was heated at 150° C. for 8 hours for drying under reduced pressure. The negative electrode case 105 was inserted into the groove for the gasket 107.

The electrolyte 106 is composed of PC and $(CH_3)(C_2H_5)_3NBF_4$ as a supporting salt. The amount of the electrolyte is 15 μL. The amount of the supporting salt ranges from 0 to 1 mol/L. (To be more specific, 0.01 mol/L, 0.10 mol/L, 0.20 mol/L, 0.25 mol/L, 0.30 mol/L, 0.35 mol/L, 0.5 mol/L, and 1.0 mol/L.) The concentration of 1.0 mol/L is the one which is used for conventional electrical double layer capacitors.

With the electrolyte 106 added, the negative electrode case 105 and the positive electrode case 103 were combined together and the latter was crimped for sealing. Thus there was obtained the desired capacitor.

Figure 4:
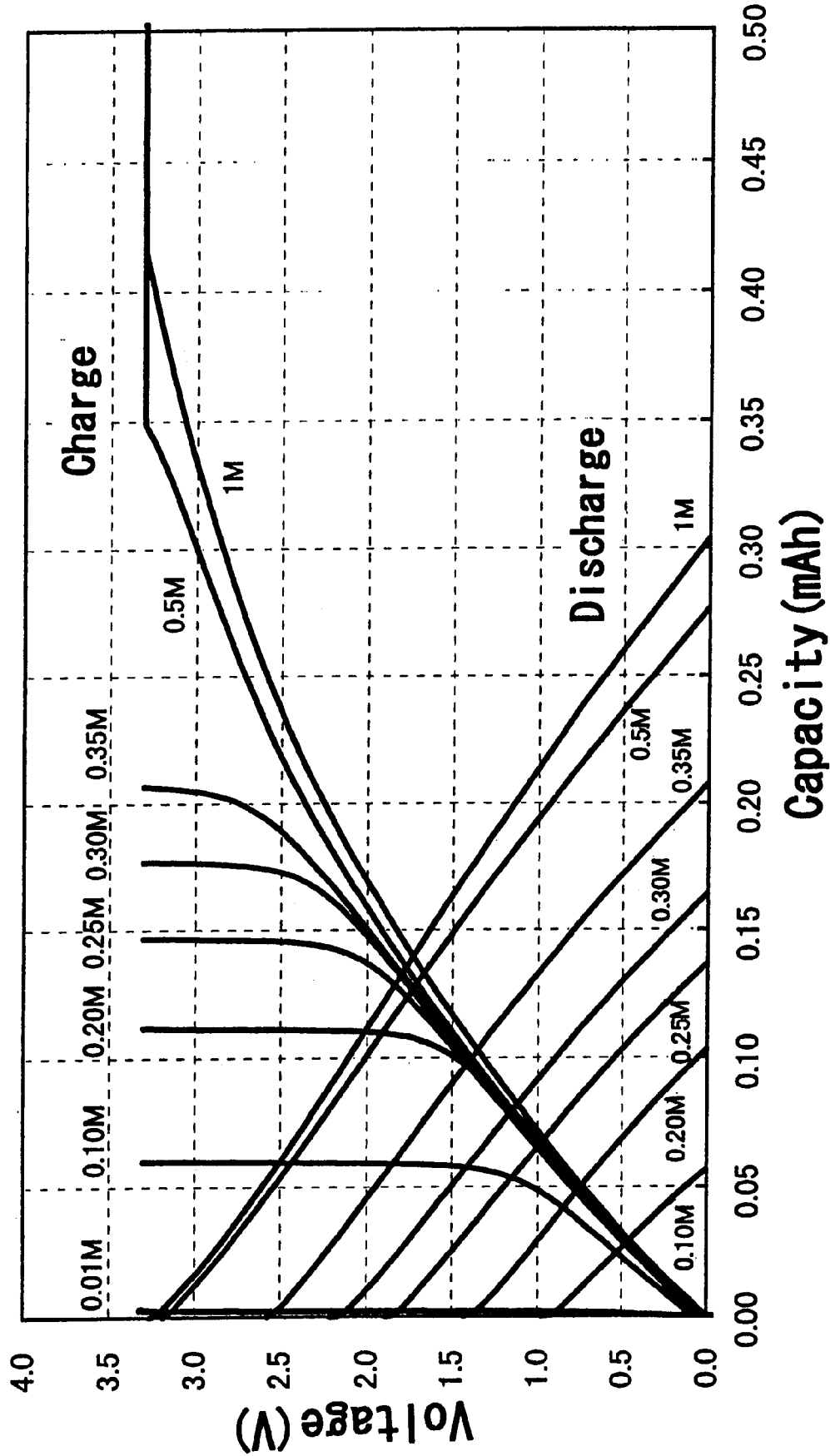
FIG. 4 is a graph showing the charge-discharge characteristics of the electrical double layer capacitor in Example 1.

The electrical double layer capacitor produced as mentioned above was tested for charging-discharging characteristics. The results are shown in FIG. 4. Charging was carried out at a charge voltage of 3.3V until the charge current decreased from 200 μA (maximum) to 20 μA. Discharging was carried out at a constant current of 50 μA until the end voltage reached 0V.

It is also noted from FIG. 4 that the voltage increases rapidly because the ionized supporting salt is adsorbed completely to the surface of activated carbon in the case of a supporting salt in low concentrations. A probable reason for this is that the ionized supporting salt in PC vanishes, causing the solution resistance to increase rapidly.

By contrast, in the case of a supporting salt in high concentrations, the ionized supporting salt continues to exist in the electrolyte even after the electrical double layer has been formed on the surface of activated carbon, with the result that current continues to flow, bringing about side reactions such as decomposition of electrolyte and dissolution of casing. Since the capacitor using activated carbon usually has a withstanding voltage of about 2.5V, it should preferably be designed such that the double layer is formed completely and the solution resistance rises at 2.5V. FIG. 4 suggests that 0.3 mol/L or 0.35 mol/L is an adequate concentration under the condition in this example. In the conditions of the example, it is considered that 0.3 mol/L or 0.35 mol/L (i.e. mole/litter) is appropriate concentration according to the graph. However, according to the size of a battery and the area of an electrode, the appropriate concentration sometimes changes. For example, in the case of the electrical double layer capacitor wherein the diameter of the battery is 4.8 mm and the height thereof is from 1.3 to 1.4 mm, there is also a case that a concentration of from 0.40 to 0.45 mol/L becomes the appropriate concentration.

The electrical double layer capacitors obtained in this example were examined for leak current (with 3.3V or 5.0V applied), increase in internal resistance after storage for 20 days, and swelling of battery (in terms of increase in battery height). The results are shown in Table 2.

after storage. However, the one with a concentration of 0.01 mol/L or less has an impracticably high internal resistance and small capacity before storage.

EXAMPLE 2

Among the electrical double layer capacitors obtained in Example 1 was selected one which holds the electrolyte containing the supporting salt in a concentration of 0.35 mol/L. After application of an excess voltage of 18V for 60 minutes, it was tested for battery height and internal resistance. For comparison, Sample No. 9 (equivalent to the conventional one) in Example 1 was also tested in the same way. The results are shown in Table 3.

TABLE 3

| No. | Concentration of supporting salt (mol/L) | Initial characteristics, internal resistance ($\Omega$) | Characteristics after voltage application (18 V) for 60 minutes | |
|---|---|---|---|---|
| | | | Increase in battery height (mm) | Increase in internal resistance ($\Omega$) |
| Conventional | 1 | 21 | 0 | 0 |
| Present invention | 0.35 | 32 | 0.2 | 45 |

It is noted from Table 3 that the electrical double layer capacitor according to the present invention remained unchanged in battery height and internal resistance. It is presumed that theoretically it has a withstanding voltage high enough for PC to break down.

TABLE 2

| | Initial characteristics | | | Characteristics after storage at normal temperature for 20 days (3.3 V) | | Characteristics after storage at normal temperature for 20 days (5.0 V) | |
|---|---|---|---|---|---|---|---|
| No. | Concentration of supporting salt (mol/L) | Internal resistance ($\Omega$) | Leak current ($\mu A$ 3.3 V) | Leak current ($\mu A$ 5.0 V) | Increase in battery height (mm) | Increase in internal resistance ($\Omega$) | Increase in battery height (mm) | Increase in internal resistance ($\Omega$) |
| 1 | 0 | 45000 | 0 | 0 | 0 | 0 | 0 | 0 |
| 2 | 0.01 | 580 | 0 | 0.04 | 0 | 0 | 0 | 0 |
| 3 | 0.10 | 68 | 0.15 | 0.21 | 0 | 0 | 0 | 1 |
| 4 | 0.20 | 45 | 0.26 | 0.28 | 0 | 1 | 0 | 0 |
| 5 | 0.25 | 38 | 0.69 | 0.72 | 0 | 1 | 0 | 3 |
| 6 | 0.30 | 35 | 0.77 | 0.84 | 0 | 2 | 0 | 2 |
| 7 | 0.35 | 32 | 1.2 | 1.5 | 0 | 2 | 0 | 1 |
| 8 | 0.50 | 26 | 4.9 | 6.8 | 0.05 | 193 | 0.2 | 336 |
| 9 | 1.00 | 21 | 8.2 | 72 | 0.16 | 285 | 0.22 | 3500 |

The leak current is the current which flows through the electrical double layer capacitor after voltage application for 24 hours. The internal resistance is the resistance which appears when, after voltage application for a prescribed period of time, the electrical double layer capacitor is discharged for 5 minutes by short-circuiting. The resistance was measured by the AC impedance technique at 1 kHz.

It is noted from Table 2 that the samples in which the concentration of the supporting salt in the electrolyte is 0.35 mol/L or less are satisfactory, with a low leak current and no or little increase in internal resistance and battery height

EXAMPLE 3

Electrical double layer capacitors differing in electrolyte active material and supporting salt as shown in Table 4 were prepared in the same way as in Example 1. The weight of the positive electrode active material 3.2 mg, the amount of the electrolyte is 15 $\mu L$, and the size of the battery is 6.8 mm in outside diameter and 2.1 mm in height.

The results are shown in Table 4. It is noted that the conventional electrolyte double layer capacitor increases in both battery height and internal resistance after storage at 80° C. for 5 days (3.3V). On the other hand, it is noted that the electrolyte double layer capacitor according to the present invention is satisfactory (with small change in battery height and internal resistance) in the case where the electrode is made with activated carbon or polyacene (PAS) or a combination thereof. It is noted that PC or γ-BL/EC as the non-aqueous solvent for the electrolyte produces good results. As for the supporting salt, ammonium salt produces good results.

the solar cell. It was found that the battery voltage increased from 0 to 2.5V. After full charging, the voltage increased to 3.2V at maximum. Irradiation with light (50000 lux) was continued for one month. After irradiation, the electrical double layer capacitor was removed, and it was examined for internal resistance and discharge capacity. The internal resistance was measured by the AC impedance technique at 1 kHz after it had been short-circuited for 5 minutes.

TABLE 4

| | | | Electrolyte | | | Initial characteristics | | Characteristics after storage at 80° C. for 5 days (3.3 V) | |
|---|---|---|---|---|---|---|---|---|---|
| No. | Positive electrode active material | Negative electrode active material | Non-aqueous solvent | Supporting salt | Conc. of supporting salt (mol/L) | Internal resistance (Ω) | Leak current (μA, 3.3 V) | Increase in battery height (mm) | Increase in internal resistance (Ω) |
| * | Activated carbon | Activated carbon | PC | $(CH_3)(C_2H_5)_3NBF_4$ | 1 | 21 | 8.2 | 0.15 | 255 |
| 1 | Activated carbon | Activated carbon | PC | $(CH_3)(C_2H_5)_3NBF_4$ | 0.35 | 32 | 1.2 | 0 | 1 |
| 2 | Activated carbon | Activated carbon | PC | $(C_2H_5)_4NBF_4$ | 0.35 | 34 | 1 | 0 | 0 |
| 3 | Activated carbon | Activated carbon | γ-BL/EC | $(CH_3)(C_2H_5)_3NBF_4$ | 0.35 | 27 | 1.3 | 0 | 2 |
| 4 | Activated carbon | Activated carbon | γ-BL/EC | $(C_2H_5)_4NBF_4$ | 0.35 | 29 | 1.1 | 0 | 0 |
| 5 | PAN | PAN | PC | $(CH_3)(C_2H_5)_3NBF_4$ | 0.3 | 22 | 1.5 | 0 | 3 |
| 6 | PAN | PAN | PC | $(C_2H_5)_4NBF_4$ | 0.3 | 21 | 1.4 | 0 | 2 |
| 7 | PAN | PAN | γ-BL/EC | $(CH_3)(C_2H_5)_3NBF_4$ | 0.3 | 19 | 1.5 | 0 | 1 |
| 8 | PAN | PAN | γ-BL/EC | $(C_2H_5)_4NBF_4$ | 0.3 | 20 | 1.6 | 0 | 0 |
| 9 | Activated carbon | PAN | PC | $(CH_3)(C_2H_5)_3NBF_4$ | 0.27 | 30 | 0.8 | 0 | 0 |
| 10 | Activated carbon | PAN | PC | $(C_2H_5)_4NBF_4$ | 0.27 | 32 | 0.7 | 0 | 1 |
| 11 | Activated carbon | PAN | γ-BL/EC | $(CH_3)(C_2H_5)_3NBF_4$ | 0.27 | 30 | 0.5 | 0 | 1 |
| 12 | Activated carbon | PAN | γ-BL/EC | $(C_2H_5)_4NBF_4$ | 0.27 | 31 | 0.9 | 0 | 1 |

*Conventional product

EXAMPLE 4

Figure 5:
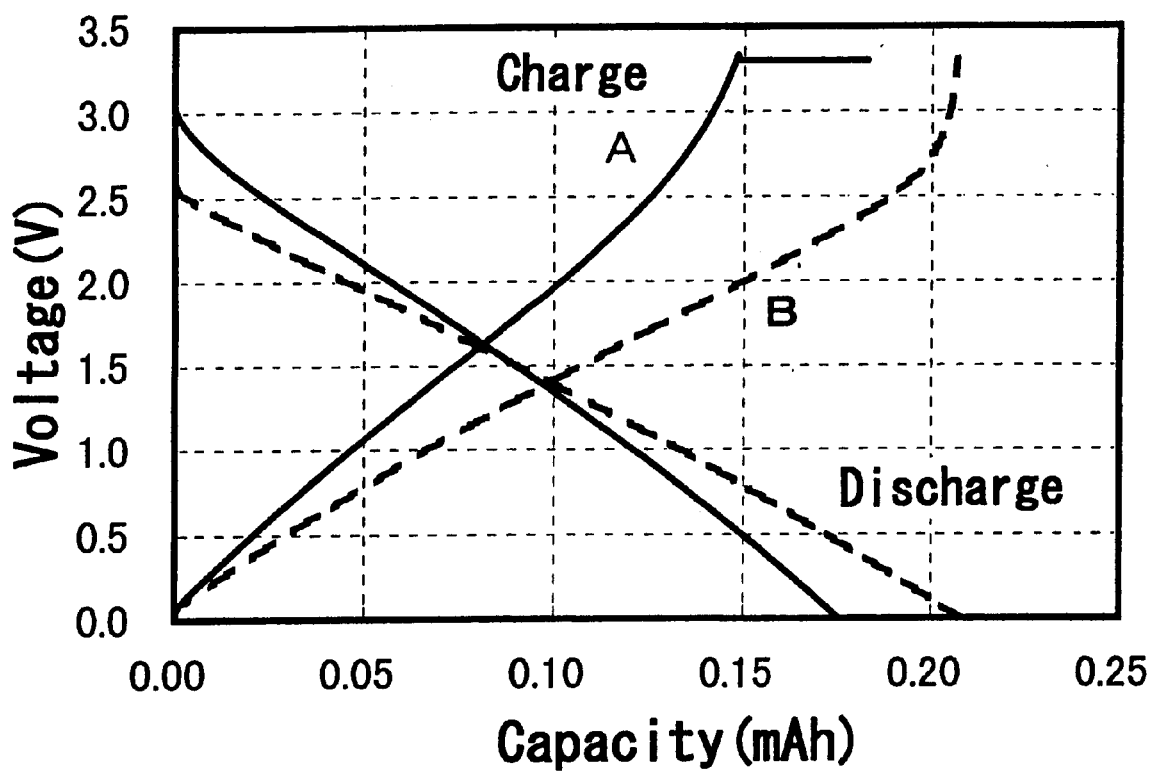
FIG. 5 is a graph showing the charge-discharge characteristics of the electrical double layer capacitor in Example 4.

An electrical double layer capacitor, in which the electrolyte contains 0.35 mol/L of supporting salt, was prepared in the same way as in Example 1 except that the positive electrode is 1.0 mm thick and the negative electrode is 0.5 mm so that the capacities of the positive electrode and negative electrode are in a ratio of 2:1. This capacitor is designated as sample A, and the capacitor in which the electrolyte contains 0.35 mol/L of supporting salt in Example 1 is designated as sample B. They were examined for charging and discharging characteristics. The results are shown in FIG. 5.

It is noted that as compared with the sample B, the sample A has a higher discharge starting voltage despite its slightly smaller capacity.

EXAMPLE 5

An electrical double layer capacitor, in which the electrolyte contains 0.35 mol/L of supporting salt, was prepared in the same way as in Example 1. It was connected in series with four solar cells (in series), so that it functions as a power source of the resulting solar watch. For comparison, a solar watch was produced with a conventional electrical double layer capacitor, in which the electrolyte contains 1.0 mol/L of supporting salt. The electrical double layer capacitor has no reverse-current preventing circuit, over-current preventing circuit, and over-discharge preventing circuit.

The thus obtained solar watch was irradiated with light (50000 lux) in a thermostat at 60° C. The electrical double layer capacitor was examined for voltage during charging by The results are shown in Table 5.

TABLE 5

| | Concentration of supporting salt (mol/L) | Initial characteristics | | Characteristics after Irradiation for one month | |
|---|---|---|---|---|---|
| No. | | Internal resistance (Ω) | Capacity (mAh) | Internal resistance (Ω) | Capacity (mAh) |
| Conventional | 1 | 20 | 0.3 | 260 | 0.26 |
| This invention | 0.35 | 30 | 0.3 | 30 | 0.3 |

It is noted that the electrical double layer capacitor according to the present invention does not deteriorate after continued irradiation when used for a solar watch. The same effect as this was confirmed also in the case of a solar calculator.

When the electrical double layer capacitor of the present invention is combined with a solar cell, the resulting machine permits the solar cells to be connected in series as many as desired without protective circuits. Therefore, it permits effective charging in a dimly-lit room or under an overcast sky. The increased number of units connected in series permits voltage to be raised and hence permits rapid charging. This leads to high performance at a low cost.

EXAMPLE 6

The electrical double layer capacitor of the present invention was used for memory backup in a portable telephone. It was tested for leak current which is consumed when the portable telephone is in waiting state.

It was found that the leak current was 8.2 $\mu$A and 1.2 $\mu$A, in the case of the conventional one and the one according to the present invention, respectively. In addition, the current consumed in the one according to the present invention is about one-eighth that of the conventional one. This is because the electrical double layer capacitor of the present invention increases infinitely in charging resistance when fully charged. This prevents the capacity of the main power source from decreasing while the portable telephone is being used.

The electrical double layer capacitor of the present invention has high reliability, and hence it can be used in combination with heat-resistant parts for reflow-soldering.

EXAMPLE 7

By the way as in Example 1, electrical double layer capacitors, wherein the concentration of supporting salt of the electrolyte was from 0.1 (mol/L) to 1 (mol/L), were prepared. The various characteristics of the electrical double layer capacitors in the case of changing the concentration of supporting salt are shown in Table 6. Then, the measurement of these characteristics is described below in detail.

Figure 6:
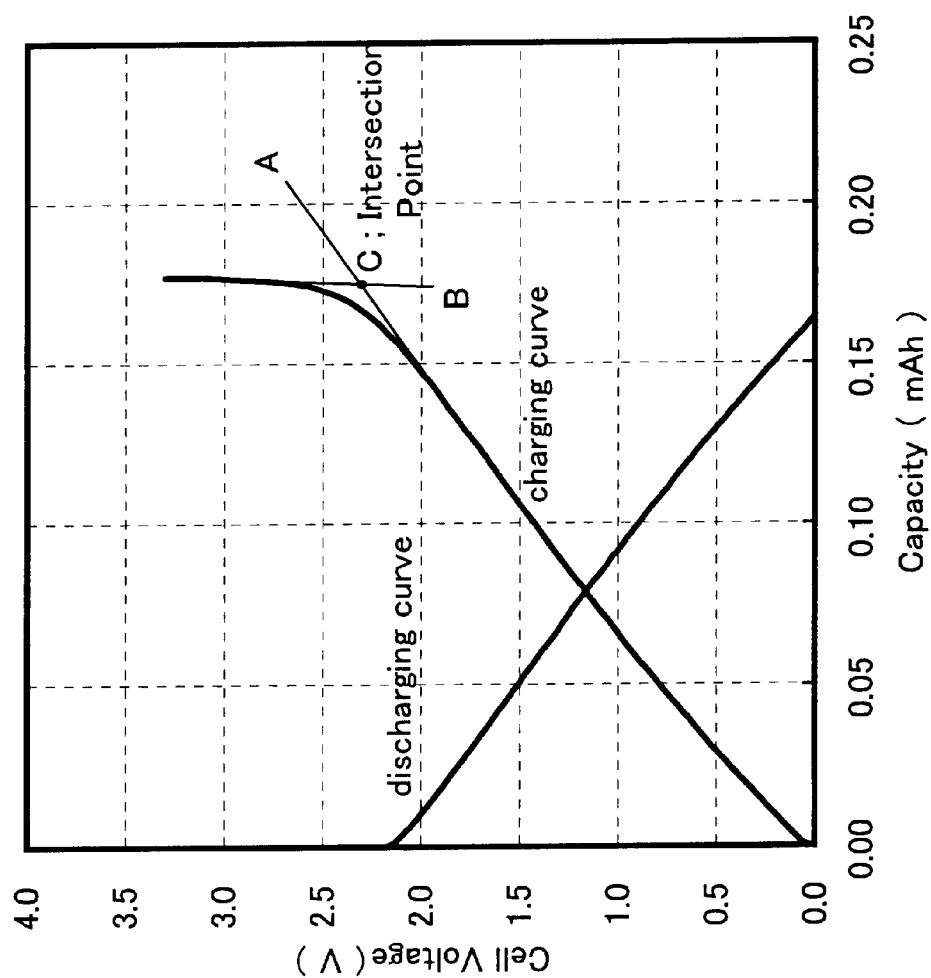
FIG. 6 is a graph showing the charge-discharge characteristics of the electrical double layer capacitor in Example 7.

The charging and discharging characteristics of the electrical double layer capacitors are measured, and the graph of a capacity and a voltage as shown in FIG. 6 is prepared. In this case, charging is carried out at the charging maximum voltage of 3.3 V and the electric current of 200 $\mu$A at the maximum (the electric current per electrode area is about 1500 $\mu$A/cm$^2$, constant current charging method) until the current lowers to 20 $\mu$A. Discharging is carried out at a constant current of 50 $\mu$A and the termination voltage of 0 V. As shown in FIG. 6, the cross point C of the extending line A of a flat part continuing from the low voltage side of the charging curve in the graph and the extending line B of a flat part continuing from 3.3 V was read from the graph, and the voltage value was shown in Table 6 as the voltage of intersection point C. Also, the capacities in this case were also shown in Table 6.

Furthermore, a voltage of 2.5 V was applied to the electrical double layer capacitors prepared, and the internal resistances after 24 hours were measured. From the internal resistances after 24 hours and the initial resistance, the increase ratio was calculated and shown in Table 6 as the increase ratio of internal resistance. Since in the electrical double layer capacitor having the low concentration of supporting salt, almost all of the supporting salt is transferred to an electrode by charging, the internal resistance is more increased in the electrical double layer capacitor having the lower concentration of supporting salt.

Furthermore, a voltage of 3.3 V was applied to the electrical double layer capacitors prepared, and the leak current after 24 hours was measured. The value obtained by dividing the leak current by the electrode area was shown in Table 6.

Since in the electrical double layer capacitor having the low concentration of supporting salt, almost all of the supporting salt is transferred to an electrode by charging, the current of charging becomes hard to pass. That is, the leak current at charging becomes smaller in the electrical double layer capacitor having the lower concentration of supporting salt.

Moreover, the capacity retention ratios of the electrical double layer capacitors prepared were measured. That is, a voltage of 3.3 V was applied to the electrical double layer capacitors, they were stored for 7 days at 70° C., and the capacities after storage were measured. From the capacity after storage to the initial capacity, the capacity retention ratio ((capacity after storage/initial capacity)×100) was calculated and shown in Table 6.

These characteristics were measured about the electrical double layer capacitors each having each concentration of supporting salt and summarized in Table 6.

TABLE 6

| Concentration of supporting salt (mol/l) | Voltage of Intersection Point C(V) | Increase ratio of Internal Resistance | Leak Current ($\mu$A/cm2) | Capacity Retention Ratio (%) | Capacity (mAh) |
|---|---|---|---|---|---|
| 0.1 | 1.15 | 100 | 1.2 | 100 | 0.057 |
| 0.2 | 1.6 | 62 | 2.1 | 100 | 0.103 |
| 0.25 | 2.1 | 32 | 5.5 | 100 | 0.137 |
| 0.3 | 2.4 | 18 | 6.1 | 100 | 0.164 |
| 0.35 | 2.68 | 10 | 9.6 | 99 | 0.207 |
| 0.4 | 2.71 | 8 | 13.3 | 96 | 0.232 |
| 0.45 | 2.77 | 6 | 17.1 | 92 | 0.249 |
| 0.46 | 2.8 | 3.9 | 18.9 | 88 | 0.258 |
| 0.47 | 2.93 | 2.8 | 21.3 | 81 | 0.272 |
| 0.5 | 3.3 | 1.6 | 39.0 | 61 | 0.276 |
| 1 | 3.3 | 1.02 | 65.3 | 56 | 0.303 |

Then, as shown in the figure below, graphs are prepared based on the characteristics shown in Table 6 and the appropriate values of the electrical double layer capacitors are investigated.

Figure 7:
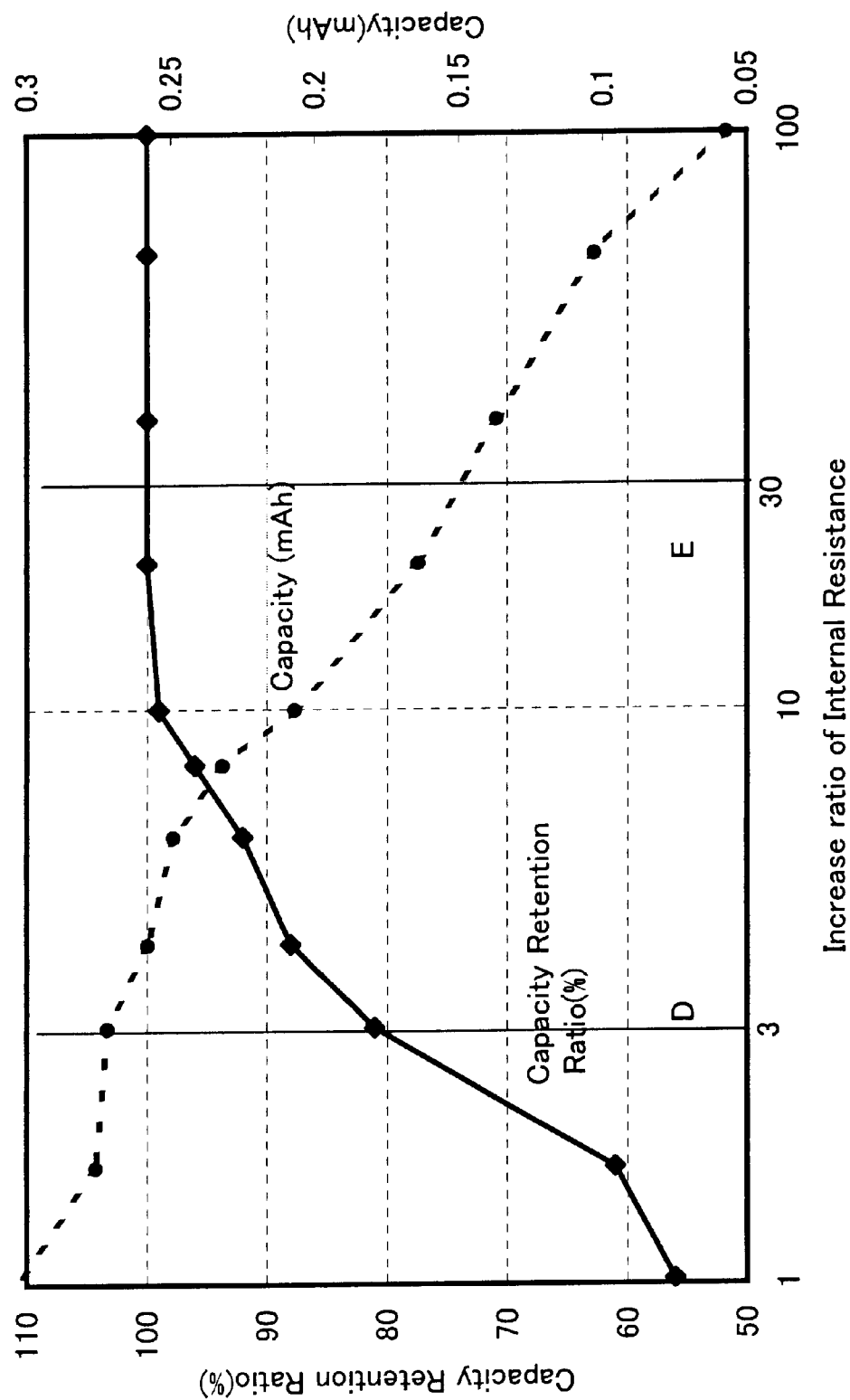
FIG. 7 is a graph showing the relation of the increase ratio of the internal resistance of the electrical double layer capacitors measured after 24 hours since the application of a voltage of 2.5 V and the capacity retention ratio or the capacity in example 7.

FIG. 7 is a graph showing the relation of the increase ratio of the internal resistance of the electrical double layer capacitors measured after 24 hours since the application of a voltage of 2.5V and the capacity retention ratio or the capacity. The concentration of supporting salt of the electrolyte can be established, for example, using the internal resistance increase ratio of the electrical double layer capacitor measured after 24 hours since the application of 2.5 V as the standard. The capacity retention ratio (after storing 7 days at 3.3 V and 70° C.) of the electrical double layer capacitor, which can be practically used, is at least about 80%, and also, the capacity is at least 0.15 mAh, which is about a half of the capacity of the case that the concentration of supporting salt is sufficient (1 mol/L). The lines D and E each showing each range are shown in the graph. The portion surrounded by these lines becomes the appropriate value of the internal resistance increase ratio of the electrical double layer capacitor. From FIG. 7, the appropriate range of the increase ratio of internal resistance is from 3 to 30 times.

Figure 8:
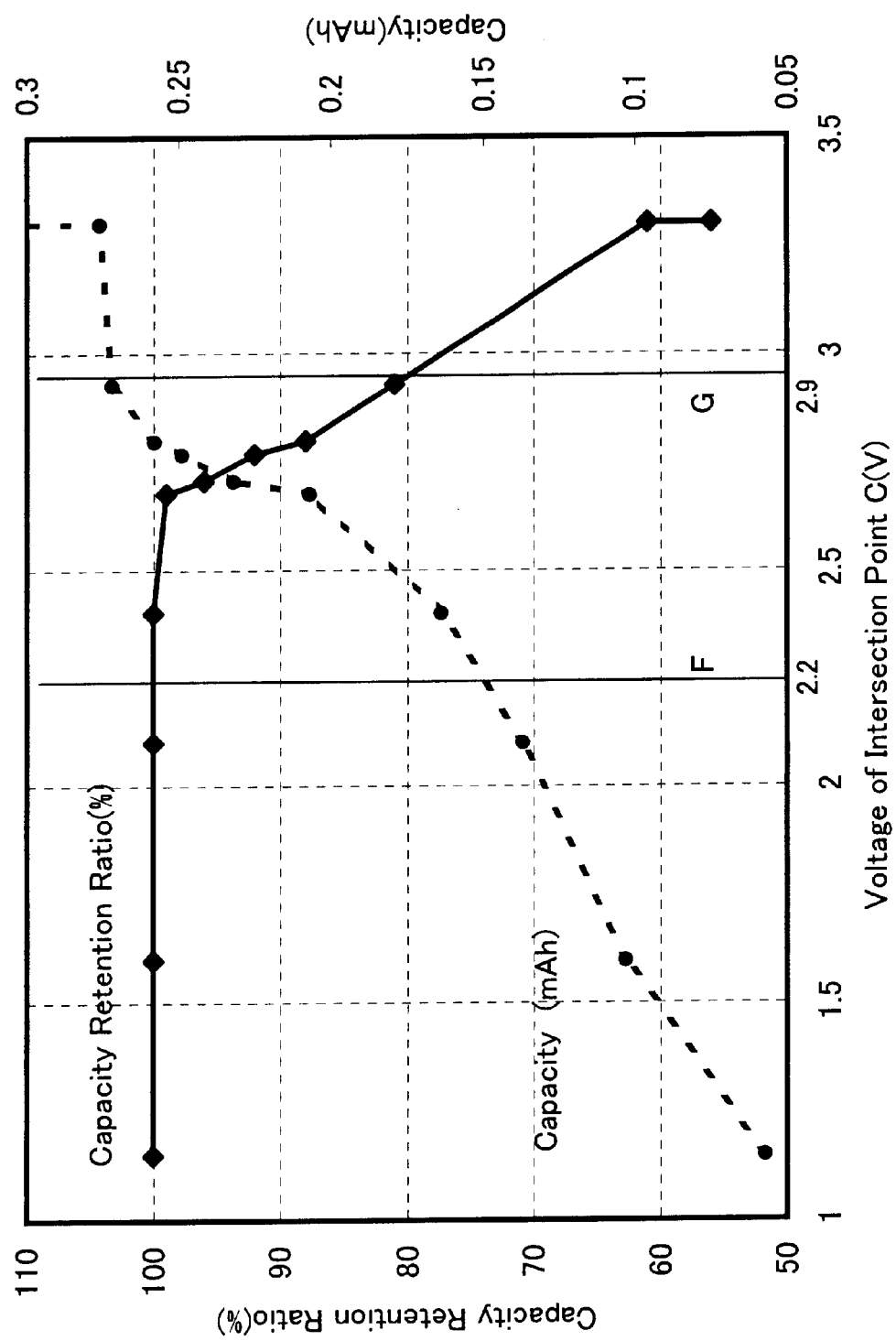
FIG. 8 is a graph showing the relation of the voltage of the above-described cross point C and the capacity retention ratio or the capacity in example 7.

FIG. 8 is a graph showing the relation of the voltage of the above-described cross point C and the capacity retention ratio or the capacity. The concentration of supporting salt of the electrolyte can be established using the voltage value of the cross point C obtained from the charging and discharging characteristics as the standard as described above. As the electrical double layer capacitor, which can be practically used, the capacity retention ratio after storing for 7 days at 3.3 V and 70° C. is required to be at least about 80%, and the capacity is required to be at least 0.15 mAh, which is about a half of the case that the concentration of supporting salt is sufficient (1 mol/L). The lines F and G each showing each range are shown in the graph. The portion surrounded by these lines becomes the appropriate value of the voltage of the cross point C. From FIG. 8, the appropriate range of the voltage of the cross point C is from 2.2 to 2.9 V.

Figure 9:
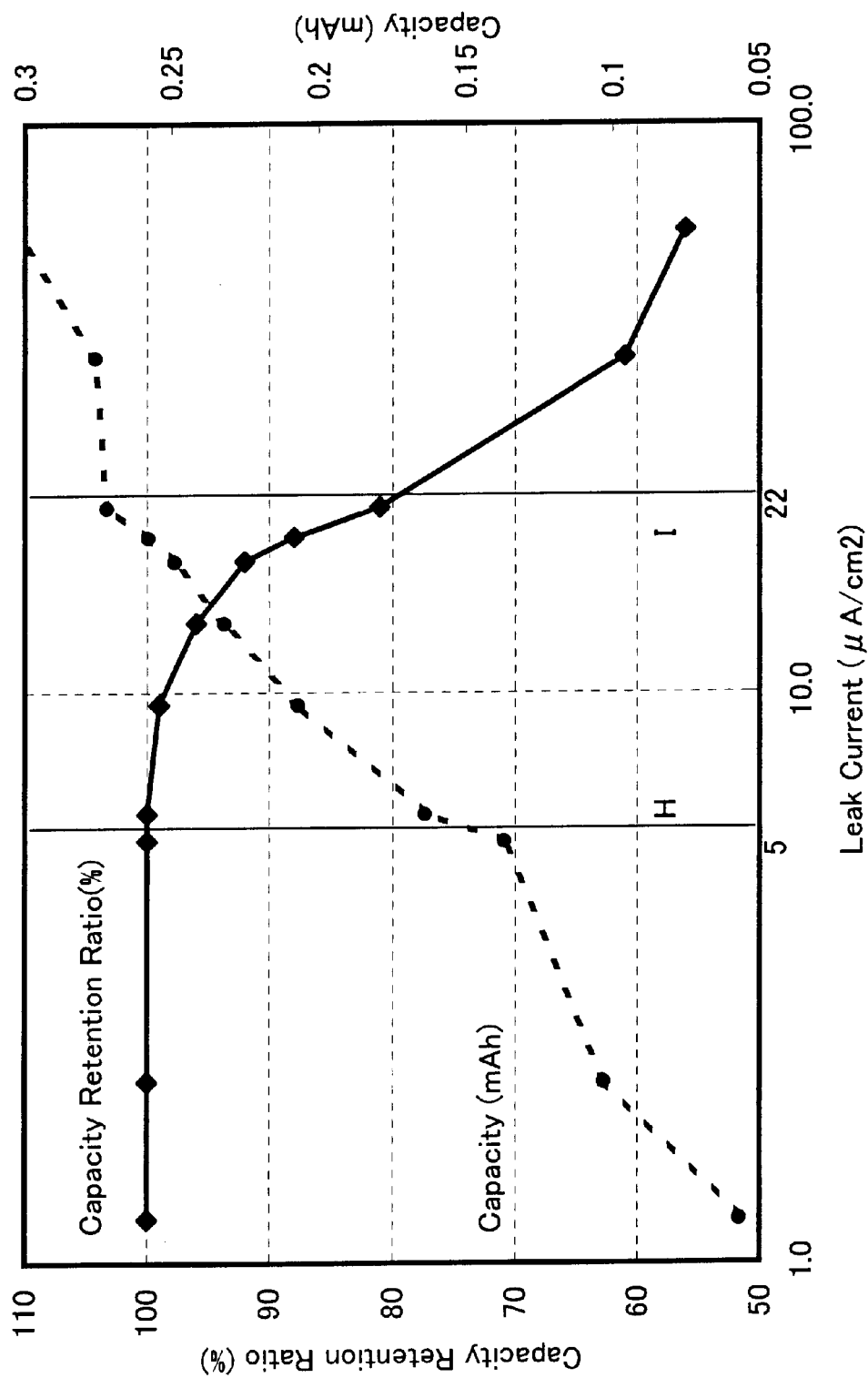
FIG. 9 is a graph showing the relation of the leak current after 24 hours at 3.3 V and the capacity retention ratio or the capacity in example 7.

FIG. 9 is a graph showing the relation of the leak current after 24 hours at 3.3 V and the capacity retention ratio or the capacity. The concentration of supporting salt of the electrolyte can be established, for example, by using the leak current as the standard. As the electrical double layer capacitor which can be used practically, the capacity retention ratio after storing for 7 days at 3.3 V and 70° C. is required to be at least about 80%, and the capacity is required to be at least 0.15 mAh, which corresponds to about a half of the case that the concentration of supporting salt is sufficient (1 mol/L). The lines H and I each showing each range are shown in the graph. The portion surrounded by these lines becomes the appropriate value of the leak current after 24 hours at 3.3 V. From FIG. 9, the appropriate range of the leak current thereof is from 5 to 22 $\mu A/cm^2$.

As described above, by establishing the concentration of supporting salt of the electrolyte such that the above-described characteristics become the appropriate range, the voltage resistance of the electrical double layer capacitor at charging is improved and also the occurrence of the deterioration of the characteristics by charging can be restrained.

The electrical double layer capacitor of the present invention exhibits greatly improved withstanding voltage at the time of charging and deterioration of its characteristics due to changing can be suppressed to an extremely low level. In addition, the electrical double layer capacitor of the invention can be used for portable machines without requiring charging control circuits or the like, and it has a very small leak current during charging which contributes to the production of inexpensive machines with low power consumption.

What is claimed is:

1. An electrical double layer capacitor comprising: an electrolyte containing a non-aqueous solvent and a supporting salt dissolved in the non-aqueous solvent; a pair of polarizing electrodes disposed in confronting relation with one another; and a separator disposed between the polarizing electrodes; wherein the supporting salt contained in the electrolyte exists only in regions proximate a surface of the polarizing electrodes when the electrical double layer capacitor is fully charged; and wherein when the electrical double layer capacitor is charged at 2.5 V for 24 hours, an internal resistance of the electrical double layer capacitor is in the range of from 3 to 30 times an internal resistance thereof before charging.

2. An electrical double layer capacitor comprising: an electrolyte containing a non-aqueous solvent and a supporting salt dissolved in the non-aqueous solvent; a pair of polarizing electrodes disposed in confronting relation with one another; and a separator disposed between the polarizing electrodes; wherein the supporting salt contained in the electrolyte exists only in regions proximate a surface of the polarizing electrodes when the electrical double layer capacitor is fully charged; and wherein when the electrical double layer capacitor is charged by a constant current charging method at a maximum voltage of 3.3 V and an electric current per polarizing electrode unit area of 1500 $\mu A/cm^2$ and a charging curve is plotted using the voltage and a capacity of the electrical double layer capacitor, the voltage of the electrical double layer capacitor at a point formed by the intersection of a line extending along a linear low voltage portion of the charging curve and a line crossing the maximum voltage of 3.3 V is in the range of 2.2 V to 2.9 V.

3. An electrical double layer capacitor comprising: an electrolyte containing a non-aqueous solvent and a supporting salt dissolved in the non-aqueous solvent; a pair of polarizing electrodes disposed in confronting relation with one another; and a separator disposed between the polarizing electrodes; wherein the supporting-salt contained in the electrolyte exists only in regions proximate a surface of the polarizing electrodes when the electrical double layer capacitor is fully charged; and wherein when the electrical double layer capacitor is charged at 3.3 V for 24 hours, a charged current after 24 hours is in the range of from about 5 $\mu A/cm^2$ to about 22 $\mu A/cm^2$ per unit area of the polarizing electrodes.

4. An electrical double layer capacitor according to claim 1; wherein the polarizing electrodes are selected from the group consisting of an activated carbon and a polyaniline.

5. An electrical double layer capacitor according to claim 1; wherein the supporting salt comprises ammonium salt.

6. An electrical double layer capacitor according to claim 1; wherein the pair of polarizing electrodes comprises a negative electrode and a positive electrode having a larger capacity than that of the negative electrode.

7. A portable electronic apparatus having an electrical double layer capacitor according to claim 1.

8. A portable electronic apparatus having an electrical double layer capacitor according to claim 2.

9. A portable electronic apparatus having an electrical double layer capacitor according to claim 3.

10. An electrical double layer capacitor comprising: an electrolyte containing a non-aqueous solvent and a supporting salt dissolved in the non-aqueous solvent at a concentration of 0.40 mol/L to 0.45 mol/L; a pair of polarizing electrodes disposed in confronting relation with one another; and a separator disposed between the polarizing electrodes; wherein the supporting salt contained in the electrolyte exists only in regions proximate a surface of the polarizing electrodes when the electrical double layer capacitor is fully charged.

11. An electrical double layer capacitor according to claim 10; wherein the electrical double layer capacitor has a diameter of about 4.8 mm and a height in the range of about 1.3 mm to 1.4 mm.

12. An electrical double layer capacitor according to claim 10; wherein the polarizing electrodes are selected from the group consisting of an activated carbon and a polyaniline.

13. An electrical double layer capacitor according to claim 10; wherein the supporting salt comprises ammonium salt.

14. An electrical double layer capacitor according to claim 10; wherein the pair of polarizing electrodes comprises a negative electrode and a positive electrode having a larger capacity than that of the negative electrode.

15. A portable electronic apparatus having an electrical double layer capacitor according to claim 10.

* * * * *